Sept. 10, 1968 W. F. SMITH 3,400,776
APPARATUS FOR CONTROLLING THE BRAKING AND ACCELERATION
OF MOTORCYCLES AND OTHER MOTOR-DRIVEN VEHICLES
Filed Nov. 14, 1966 2 Sheets-Sheet 1

INVENTOR.
WILLIAM F. SMITH
BY Fulwider, Patton, Rieber,
Lee, and Utecht
ATTORNEYS Sept. 10, 1968  W. F. SMITH  3,400,776
APPARATUS FOR CONTROLLING THE BRAKING AND ACCELERATION
OF MOTORCYCLES AND OTHER MOTOR-DRIVEN VEHICLES
Filed Nov. 14, 1966  2 Sheets-Sheet 2
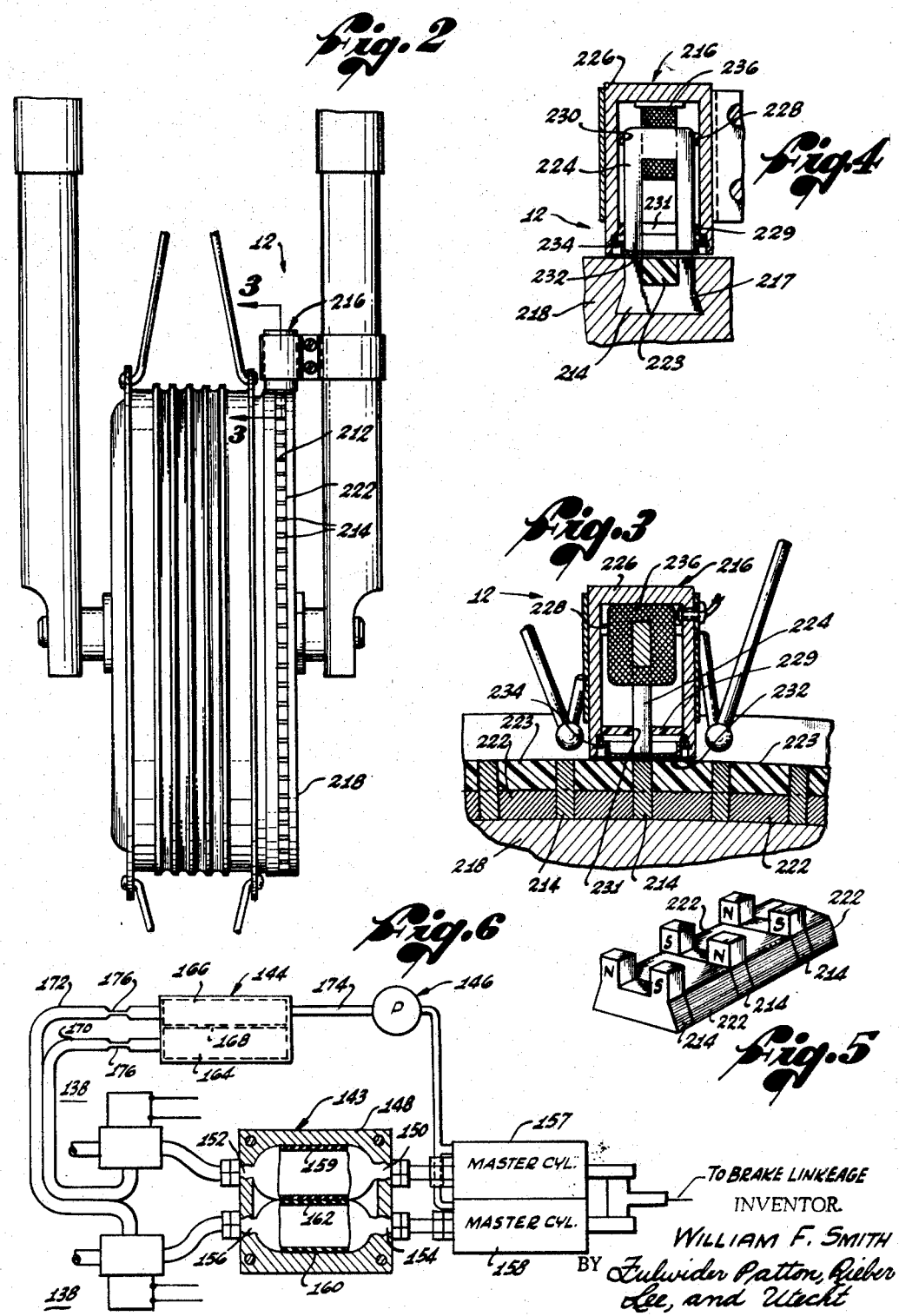
INVENTOR.
WILLIAM F. SMITH
BY Fulwider, Patton, Rieber
Lee, and Utecht
ATTORNEYS

United States Patent Office 3,400,776
Patented Sept. 10, 1968

3,400,776
APPARATUS FOR CONTROLLING THE BRAKING AND ACCELERATION OF MOTORCYCLES AND OTHER MOTOR-DRIVEN VEHICLES
William F. Smith, 13466 Pierce St., Pacoima, Calif. 91331
Filed Nov. 14, 1966, Ser. No. 593,841
9 Claims. (Cl. 180—33)

The present invention relates to safety apparatus for motorcycles and other motor-driven vehicles and, more particularly, to apparatus for preventing the wheels of a motorcycle from locking during braking and for preventing the rear wheel of the motorcycle from spinning during acceleration of the cycle.

Most motorcycle associated injuries occur as a result of the motorcycle driver falling from or with his motorcycle. In some cases, the fall itself results in personal injury to the driver while in other cases the injury occurs as a result of other vehicles striking the fallen driver.

One of the major causes of motorcycle driver falls is over-reaction by the driver to sudden changes in traffic conditions and particularly those which cause the driver to suddenly apply the brakes of the cycle. When this occurs, the wheels of the motorcycle invariably lock causing the cycle to skid. While skidding, the driver has little or no control over the motorcycle and attempts to avoid other vehicles, pedestrians, or obstacles, usually resulting in the cycle and driver falling to the ground.

Another dangerous condition for motorcycle drivers occurs when the rear wheels of the cycle spin during acceleration. This usually occurs on wet, soft or gravel surfaces and commonly causes the driver to lose control of the cycle resulting in injury to himself or to the person and property of others.

In view of the foregoing safety problems, it is a general object of the present invention to increase the safe handling and driving of motorcycles and other motor-driven vehicles particularly during braking and acceleration.

Another object of the present invention is to provide apparatus for preventing the wheels of a motorcycle from locking during braking, thereby preventing dangerous skidding of the motorcycle and allowing the driver to maintain control of the cycle and safely maneuver out of trouble.

A further object of the present invention is to provide apparatus of the foregoing character further including means for preventing the wheels of the motrocycle from spinning during acceleration to further increase the safe handling of the cycle.

Still another object of the present invention is to provide apparatus of the foregoing character including signal generators for generating electrical signals indicative of the rotational velocity of the front and rear wheels of the motorcycle and circuitry for receiving the signals and for automatically reducing power to the rear wheel of the cycle when the electrical signals indicate that the rear wheel is rotating at a higher velocity than the front wheel, and for automatically regulating the brakes of the vehicle when the electrical signals indicate that one of both of the wheels are about to lock, thereby preventing dangerous spinning of the rear wheel of the cycle during acceleration and preventing locking of the wheels during braking.

The foregoing as well as other objects and advantages of the present invention may be more clearly understood by reference to the following detailed description when considered with the drawings which, by way of example only, illustrate a form of safety apparatus embodying the features of the present invention.

In the drawings:
FIGURE 1 is a schematic, wiring diagram of the circuitry and brake and motor power regulating elements included in the motorcycle safety apparatus of the present invention;

FIGURE 2 is a fragmentary front view of one of the wheels of the motorcycle including the safety apparatus of the present invention, illustrating the structural arrangement for one of the signal generators of the safety apparatus;

FIGURE 3 is a fragmentary sectional side view taken along the line 3—3 in FIGURE 2, illustrating the internal construction of the signal generator including a ring of spaced magnets on the drum of the wheel and a magnetic pickup supported over the ring of magnets;

FIGURE 4 is a fragmentary sectional front view of the combination illustrated in FIGURE 3;

FIGURE 5 is a perspective view of a portion of the ring of magnets comprising one of the elements of the signal generator; and FIGURE 6 is a schematic representation of a portion of the brake system for the motorcycle including means for regulating the brakes to prevent the wheels of the motorcycle from locking.

Figure 1:
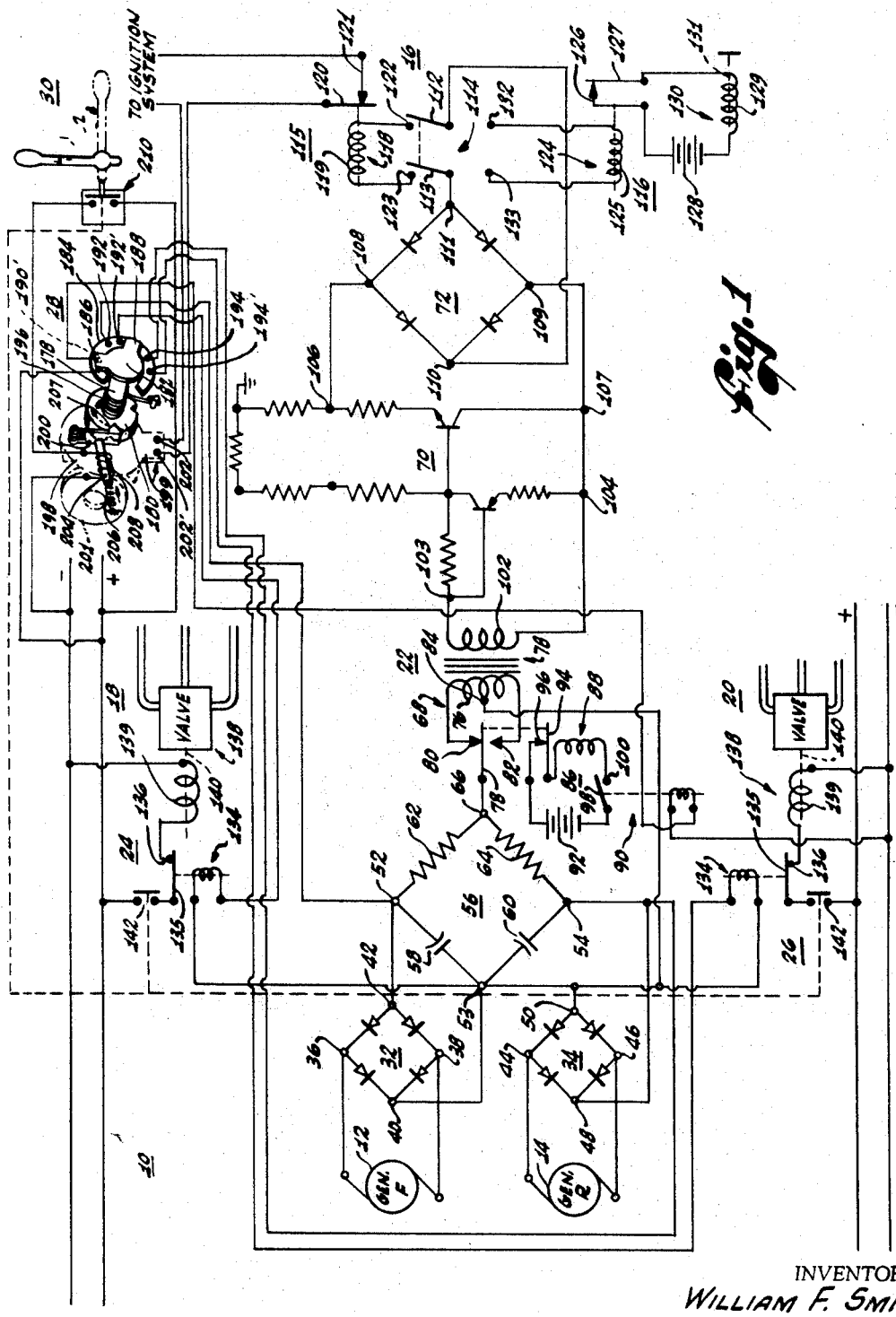

Generally speaking, the safety apparatus of the present invention is ideally suited to use on a two-wheel motorcycle and is specifically adapted to prevent the rear wheel of the motorcycle from spinning during acceleration and the front and rear wheels of the cycle from locking during braking.

Basically, the safety apparatus prevents the rear wheel from spinning during acceleration by selectively reducing the power drive to the rear wheel when the rear wheel begins to spin. In particular, the apparatus is designed to maintain substantially uniform rotational velocity for the front and rear wheels of the motorcycle.

To prevent the front and rear wheels from locking during braking, the safety apparatus regulates the front and rear wheel brakes to reduce the braking action on the wheels when the wheels begin to lock.

In the foregoing manners, the safety apparatus prevents dangerous wheel spinning and skidding of the motorcycle, thereby allowing the driver of the motorcycle to maintain control over the cycle at all times even though he may have over-reached and applied full brake power in response to a sudden change in traffic conditions and even though the motorcycle may be accelerating on wet, soft or loose gravel surfaces.

The over-all safety apparatus is denoted by the numeral 10 and is diagrammatically illustrated in FIGURE 1 as including a pair of signal generators 12 and 14 connected to the front and rear wheels, respectively, of the associated motorcycle (not shown). Accordingly, the signal generator 12 may be referred to as the front wheel signal generator and the signal generator 10 as a rear wheel signal generator. The signal generators may take various forms. A preferred form of signal generator is illustrated in FIGURES 2, 3, 4 and 5 and will be discussed in detail hereinafter. For a general understanding of the safety apparatus 10, however, it suffices to say that the front and rear wheel signal generators are connected to the front and rear wheels of the motorcycle and are adapted to generate A-C signals indicative of the rotational velocity of the front and rear wheels, respectively.

In the safety apparatus 10, the electrical signals generated by the front and rear wheel signal generators, which will hereinafter be referred to as the first and second electrical signals, respectively, control motor power reducing equipment 16 and front and rear wheel brake regulator units 18 and 20 through electrical circuits 22 and 24 and 26, respectively.

Generally speaking, the motor power reducing equipment 16 operates during acceleration of the motorcycle and is adapted to reduce power from the cycle's motor to the rear wheel of the cycle when the first and second electrical signals indicate that the rear wheel has just started to spin relative to the front wheel. In this manner, the power reducing equipment functions to maintain substantially uniform rotational velocity of the front and rear wheels and prevent dangerous spinning of the rear wheel even on soft or wet surfaces.

The front wheel brake regulator 18 on the other hand, is adapted to reduce the braking action of the front wheel brake when the first electrical signal indicates that the front wheel is about to lock. The rear wheel brake regulator 20 performs the same function for the rear wheel brake in response to the second electrical signal. In this manner, the front and rear wheel brake regulators prevent the wheels of the motorcycle from locking during braking, thereby allowing the driver of the motorcycle to control the motorcycle without skidding and to maneuver safely out of trouble despite the fact that he may have over-reacted and have suddenly applied full power to the brakes of the cycle.

The electrical circuits 22, 24 and 26 may be adapted to operate directly upon the A-C signals developed by the signal generators 12 and 14. However, in the illustrated form of the safety apparatus 10, the A-C signals are converted to D-C signals and the electrical circuits are adapted to handle D-C signals and to control the motor power reducing equipment and front and rear brake regulator units in response thereto.

In addition, the electrical circuitry of the safety apparatus 10 is under the selective control of a switch unit 28 which includes the rear shift 30 for the motorcycle. Generally speaking, the switch unit 28 functions to selectively connect the signal generators to the electrical circuit 22 while the motorcycle is accelerating in low, first and second gears, and automatically disconnects the circuit 22 and connects the signal generators to the circuits 24 and 26 when the motorcycle enters third or high gear. Accordingly, the safety apparatus 10 functions to prevent the rear wheel of the motorcycle from spinning during acceleration of the motorcycle in low, first and second gears and functions to prevent the wheels of the motor cycle from locking during braking while the motorcycle is in high gear.

In FIGURE 1 the circuitry for converting the A-C signals developed by the signal generators 12 and 14 to D-C signals includes a pair of full wave rectifiers 32 and 34, each comprising a conventional diode bridge. In the full wave rectifier 32, the first A-C signal, that is, the signal generated by the front wheel signal generator 12, is applied to input terminals 36 and 38 and a corresponding first D-C signal is developed between the output terminals 40 and 42 of the rectifiers. Similarly, in the full wave rectifier 34, the second A-C signal, that is, the signal developed by the rear wheel signal generator 14, is applied to input terminals 44 and 46 and a corresponding second D-C signal is developed between the output terminals 48 and 50 of the rectifier. The first and second D-C signals are applied to terminals 52, 53 and 54, 53 of a normally balanced bridge circuit 56 across capacitors 58 and 60 comprising first and second legs of the bridge circuit.

As illustrated, the bridge circuit 56 is common to the circuit 22 and the circuits 24 and 26, and in addition to the capacitors 58 and 60, includes resistors 62 and 64 comprising the third and fourth legs of the bridge circuit. The resistors 62 and 64 are of equal value as are the capacitors 48 and 50. Therefore, when the first and second D-C signals are of equal value, indicating the front and rear wheels are turning at the same velocity, a zero voltage is developed between output terminals 53 and 66 of the bridge circuit, the output terminals comprising junctions of the first and second, and third and fourth legs of the bridge, respectively.

The output terminals 53 and 66 of the bridge circuit 56 are connected to the circuit 22. As previously indicated, the circuit 22 controls the operation of the motor power reducer equipment 16 when the motorcycle is operating in low, first and second gears to prevent the rear wheel of the motorcycle from dangerously spinning durinng motorcycle acceleration. In the illustrated form of the safety apparatus 10, the D-C output from the bridge circuit 56 is of insufficient value to energize the motor power reducing equipment 16. Accordingly, it is a function of the circuit 20 to amplify the D-C output of the bridge circuit to a level sufficient to activate and control the power reducing equipment 16. To accomplish this, the circuit 22 includes a chopper 68 for first converting the D-C output of the bridge circuit 56 to an A-C signal which, in turn, is amplified by an amplifier 70 and applied to a full wave rectifier 72. The rectifier 72 then converts the amplified A-C signal to an amplified D-C signal for energizing the power reducer equipment 16.

The chopper 68 is of conventional form including a vibrator reed 74 connected to the output terminal 66 of the bridge circuit 56, and the primary winding 76 of a transformer 78 having its terminals connected to contacts 80 and 82 on opposite sides of the vibrator reed. A center tap 84 on the primary winding 76 is connected to the output terminal 53 of the bridge circuit 56 and the vibrator reed is adapted to oscillate back and forth between the contacts 80 and 82 in response to and under the control of a vibrator reed control circuit 86.

The reed control circuit 86 includes a pair of relays 88 and 90 and a battery 92. Contacts 94 and 96 of the relay 88 are normally closed and the contact 94 is connected to the vibrator reed 74 whereby movement of the contact 94 produces a like movement of the reed between the contacts 80 and 82. The winding of the relay 88 is connected in series with normally open contacts 98 and 100 of the relay 90 and the battery 92. The battery 92, in turn, is connected to the contact 96 of the relay 88 to complete a series loop circuit. The winding of the relay 90 is connected to the negative pole of the battery for the motorcycle and to the positive pole of the motorcycle battery through the switch unit 38.

In operation, and under the control of the switch unit 28, when the motorcycle is in low, first or second gear, current is supplied from the motorcycle battery to the winding of the relay 90 to cause the normally open contacts 98 and 100 to close. This completes a path for current from the battery 92 through the winding of the relay 88. As current flows through the winding of the relay 88, the contact 94 is drawn from the contact 96 causing the vibrator reed 74 to move from the contact 80 to the contact 82. The movement of the contact 94 from the contact 96 opens the current path from the battery 92 causing the field in the winding of the relay 88 to collapse and the contact 94 to return to the contact 96. As this occurs, the vibrator reed returns to the contact 82. The foregoing operation is self repeating and the vibrator reed oscillates between the contacts 80 and 82 to alternately apply the voltage at the output terminal 66 to the opposite terminals of the primary winding 76 of the transformer 78. In this manner, an A-C signal is generated in the primary winding 76 which in turn is coupled to the transformer's secondary winding 102 connected to the input terminals 103, 104 of the amplifier 70.

The amplifier 70 is a conventional transistor amplifier and develops an amplified A-C signal at output terminals 106, 107, the output terminals being connected to input terminals 108, 109 of the full wave rectifier 72.

The full wave rectifier 72 comprises a conventional diode ring and converts the amplified A-C to an amplified D-C signal at the output terminals 110, 111 thereof. The output terminals are connected to switch arms 112, 113 of a double pole switch 114 in the power reducing equipment 16. Therefore, the amplified D-C signal is applied to the equipment 16 to control the operation thereof.

In summary, in the circuit 22, a D-C signal is developed at the output of the bridge circuit to indicate that the rear wheel is turning at a higher velocity than the front wheel. The D-C signal is converted to an A-C signal by the chopper 68, amplified in the amplifier 70 and reconverted to a D-C signal by the full wave rectifier 72 to control the motor power reducing equipment 16.

In the illustrated form of the present invention, the power reducing equipment 16 includes separate units 115 and 116 controlling either the ignition system or the carburetor in the motorcycle engine depending upon the position of the switch 114. The unit 115 comprises a relay 118 including a winding 119 and normally closed contacts 120 and 121. The contacts are connected in series with the circuitry from the ignition switch to the ignition system while the terminals of the winding 119 are connected to a pair of contacts 122, 123 in the switch 114. When the switch arms 112, 113 are in an "up" position, they make electrical contact with the contacts 122, 123 to apply the D-C output of the rectifier 72 directly to the winding 119. When the rear wheel of the motorcycle is spinning relative to the front wheel, the D-C output from the rectifier 72 is sufficient to operate the relay 118 and thereby open the circuitry of the ignition system to reduce power from the motor to the rear wheel until the rotatoinal velocity of the rear wheel equals that of the front wheel. At that time, the D-C output of the rectifier 72 reduces to zero to de-energize the relay 118 and again close the circuitry of the ignition system.

The unit 116 comprises a relay 124 including a winding 125 and a pair of normally closed contacts 126 and 127. The contacts are connected in a series circuit comprising a battery 128 and the winding 129 of a solenoid 130 having its armature 131 connected to a butterfly valve (not shown) in the carburetor of the motorcycle's engine. The winding 125, on the other hand, is connected to contacts 132, 133 in the switch 114. When the switch arms 112, 113 are in a "down" position, they make electrical contact with the contacts 132, 133 to apply the D-C output of the rectifier 72 directly to the winding 125. When the rear wheel of the motorcycle is spinning relative to the front wheel, the D-C output from the rectifier 72 is sufficient to operate the relay 12 and thereby open the series circuit including the contacts 126, 127. As the series circuit is opened, the solenoid 130 is de-energized to move the armature 131 and alter the condition of the butterfly valve in a manner which will reduce motor power to the rear wheel. Power to the rear wheel continues at the reduced level until the rear wheel ceases to spin relative to the front wheel. At that time, the D-C output of the rectifier 72 reduces to zero to de-energize the relay 124 and return the butterfly valve to its normal condition.

As previously indicated, the bridge circuit 56 is connected to the circuits 24 and 26 as well as the circuit 22. Briefly, the circuits 24 and 26 function to monitor the electrical signals developed by the signal generators 12 and 14 and to control the brake regulators 18 and 20 in a manner which will prevent the wheels of the motorcycle from locking during braking operation.

Basically, the circuits 24 and 28 each includes a voltage sensitive relay 134 including a pair of normally closed contacts 135, 136. The winding of the relay 134 in the circuit 24 is connected (through the switch unit 28) across the capacitor 58 of the bridge circuit 56, while the winding of the relay in the circuit 26 is connected across the capacitor 60 also through the switch unit.

During operation of the associated motorcycle and as the signal generators 12 and 14 develop electrical signals, voltages across the capacitors 58 and 60 maintain the relays 134 in an energized state and the contacts thereof closed as indicated. However, when the rotation of either or both of the wheels of the motorcycle slows down, as during braking, and the angular velocity thereof drops to a predetermined value, insufficient voltage is developed by the associated signal generator to maintain the associated relay 134 in an energized state. Let us assume that the rear wheel has slowed below the predetermined value, that is, the rear wheel has begun to lock. As this occurs, the contacts 135, 136 of the de-energized relay 134 open to cause the brake regulator unit 20 to function in a manner which reduces the braking action of the rear wheel brake until the rear wheel again turns with an angular velocity greater than the predetermined value. In this manner, the circuits 24 and 26 operate in conjunction with the signal generators 12 and 14 and brake regulator units 18 and 20 to prevent the wheels of the motorcycle from locking during braking and thereby allow the motorcycle driver to maintain control of his motorcycle and steer out of difficulty even though he may have over-reacted to a sudden change in traffic conditions.

Brake regulator units 18 and 20, capable of the just described selective control of the front and rear wheel brakes, may take various forms. In the illustrated safety apparatus 10, the brake regulator units 18 and 20 each comprise a conventional solenoid-controlled bypass valve 138 including a winding 139 and an armature 140 connected to a valve (not shown) for opening and closing a brake fluid bypass port in a valve body 141 (see FIGURE 6). The winding 139 of each solenoid is connected to the stationary contact 136 of the associated relay 134 and to the negative pole of the motorcycle battery. The movable contact 135 of each relay 134 is connected to a positive pole of the motorcycle battery through a switch 142 of the switch unit 28 to complete a current path from the motorcycle battery through the winding 139 when the contacts are closed, that is, when the wheels of the motorcycle are turning at a velocity greater than the predetermined value. Under such conditions, the bypass valves 138 are closed and the brake regulator units are said to be de-energized, allowing the wheel brakes to function in a normal manner.

However, when the motorcycle is in high gear and either or both of the wheels slows to an angular velocity below the predetermined value, the associated relay 134 is de-energized to open the contacts 135, 136 thereof. As this occurs, the associated solenoid is de-energized to open the bypass valve 138 permitting brake fluid to pass from the associated brakes to thereby reduce its braking action and allow the associated wheel to continue to turn rather than lock. Thereafter, when the particular wheel again turns with sufficient angular velocity to energize its associated relay 134, the associated brake regulator unit is again de-energized to allow normal brake operation.

A preferred form of the brake regulator units 18 and 20 is diagrammatically represented in FIGURE 6 as including the previously described bypass valves 138, as well as a pressure equalizer 143, a surge chamber 144 and a pump 146.

The pressure equalizer 143 functions to equalize the pressure of the brake fluid flowing to the front and rear brakes and to this end includes a hollow housing 148 having two pair of aligned inlet and outlet ports 150, 152 and 154, 156. The inlet ports 150 and 154 are connected to master cylinders 157 and 158 for the front and rear brakes, respectively, and receive brake fluid therefrom, while the outlet ports 152 and 156 are connected to the bypass valves 138 to supply brake fluid to the front and rear brakes, respectively. Within the housing 148, the pressure equalizer 143 includes a pair of similar bladders 159 and 160. The bladders 159 and 160 are formed of rubber or plastic material and include aligned inlet and outlet ports connected to the inlet and outlet ports 150, 152 and 154, 156, respectively. Common side walls 162 of the bladders are connected together. Accordingly, any pressure differences in the fluid from the master cylinders 157 and 158 cause the bladders 159 and 160 to deform relative to each other and exert pressures on the fluids therein causing brake fluid leaving the outlet ports 152 and 156 to be of equal pressure.

The surge chamber 144 functions to prevent brake fluid from surging to the pump 146 for return to the master cylinders and to this end is divided into two compartments 164 and 166 by a weir 168. The compartment 164 is connected by a line 170 to the bypass port of the valve 138 associated with the rear brake while the compartment 166 is connected by a line 172 to the bypass port of the valve 138 associated with the front brake and by a line 174 to the pump 146 for returning brake fluid to the master cylinders 157 and 158. Both lines 170 and 172 include similar metering orifices 176 to meter the flow of brake fluid from the bypass valves to the compartments 164 and 166.

In summary, brake fluid is supplied by the master cylinders 157, 158 through the pressure equalizer 143 to the bypass valves 138. Under normal operating conditions, the brake fluid passes directly through the bypass valve to the front and rear brakes. However, should either of the front or rear wheels begin to lock during braking, the associated bypass valve 138 is activated to open its bypass port and pass a portion of the brake fluid to the surge chamber 144. From the chamber 144, the brake fluid is returned to the master cylinders by operation of the pump 146. The reduction of brake fluid to the brake of the wheel which is about to lock reduces the braking action on the wheel, permits the wheel to continue to turn rather than lock, and thereby prevents dangerous skidding of the motorcycle.

As previously indicated, the switch unit 28 selectively controls the safety apparatus 10 to regulate connection of the signal generators 12 and 14 to the electrical circuits 22 or 24 and 26 in accordance with the position of the gear shift 30. To accomplish this, the switch unit 28 includes a contact carrying ring 184 of insulating material and a shaft 178 carrying a disc 180 and a switch arm plate 182. The shaft 178 is supported for turning with the plate 182 riding along the forward face of the ring 184. In this regard, the plate 182 carries two radially extending switch arms 186 and 188 for selectively engaging pairs of electrical contacts supported on the ring 184.

The pairs of contacts are represented by the numerals 190, 190', 192, 192' and 194, 194' and are spaced from each other such that in one position the switch arm 186 closes the contacts 190, 190' while in a second position the switch arms 186 and 188 close the contcats 192, 192' and 194, 194', respectively. The contacts 190 and 190' are connected to the negative terminal of the motorcycle battery and to the winding of the relay 90—the winding of the relay 90 also being connected to the positive terminal of the motorcycle battery. The contacts 192 and 192' are connected to the input terminal 52 of the bridge circuit 56 and to the winding of the relay 134 in the circuit 24—the winding also being connected to the output terminal 53 of the bridge circuit. The contacts 194 and 194' are connected to the input terminal 54 of the bridge circuit and to the winding of the relay 134 in the circuit 26.

In the switch unit 28, the shaft 178 is normally urged in a clockwise direction to position the switch arms 186 and 188 over the contacts 192, 192' and 194, 194'. This is accomplished by a spring 196 coiled around the shaft 178 with one end connected to a stationary reference member and an opposite end to the disc 180.

To set the switch arm 186 over and in contact with the contacts 190, 190', it therefore is necessary to rotate the shaft 178 and disc in a counterclockwise direction in opposition to the force of the spring 196. To accomplish this, a hand-turntable knob 198 is mounted for turning on the shaft 178 and carries an ignition switch arm 199 and a pivot arm 200. In the motorcycle, the knob 198 may be mounted on the console within easy reach of the operator and as indicated in phantom outline may be locked and unlocked relative to the console by use of a key 201 in an associated lock (not shown). The ignition switch arm 199 is adapted to close ignition switch contacts 202 of the ignition system circuitry when the knob is turned to a relatively counterclockwise position. The pivot arm 200 is pinned to the knob 198 for swinging movement about an axis parallel to the shaft 178 with one end riding on the periphery of the disc 180. In this regard, a rod 204 is continuously urged by a spring 206 against the piovt arm 200 to maintain the end of the pivot arm against the edge of the disc.

When the knob is turned in a clockwise direction, the end of the pivot arm 200 rides into a recess 207 in the disc 180 to releasably lock the knob to the disc and hence to the shaft 178. A subsequent turning of the knob in a counterclockwise direction causes the pivot arm 200 to turn the disc 180 and hence the shaft 178 in a counterclockwise direction to shift the switch arm 186 over and against the contacts 190 and 190'. When the switch arm 186 closes the contacts 190, 190', the switch unit 28 connects the circuit 22 to the signal generators 12 and 14. Since the contacts 192, 192' and 194, 194' are open, the circuits 24 and 28 are not connetced to the signal generators. Also, when the circuit 22 is connected to the signal generators, the ignition switch arm 199 closes the ignition contacts 202 to allow the motorcycle to be started.

In order to selectively release the shaft 178 and allow the switch arms 186 and 188 to again close the contacts 192, 192' and 194, 194', the switch unit 28 includes means for selectively retracting the rod 204 freeing the pivot arm 200. Under the influence of the spring 196, the shaft 178 is then free to turn in clockwise direction to cause the switch arms 186 and 188 to close the contacts 192, 192' and 194, 194'.

Such selective withdrawal of the rod 204 from the pivot arm 200 to caused by the magnetic field generated in response to a current flowing through a winding 208 around the rod. The winding 208 is connected to the negative terminal of the motorcycle battery and through a normally open switch 210 to the positive pole of the battery. The switch 210 is connected to the gear shift 30 such that the switch 210 is open when the gear shift is in low, first and second gears. When the gear shift moves to third gear, however, the switch 210 closes to provide a current path through the winding 208 to retract the rod and thereby allow the shaft 178 and disc 180 to turn and close the contacts 192, 192' and 194, 194'.

When the contacts 192, 192' and 194, 194' are closed, the circuits 24 and 26 are connected to the signal generators to monitor operation of the motorcycle. At the same time, the contacts 190, 190' are open to disconnect the circuit 22 from the signal generators.

It is to be noted that the switch 210 is connected to the switches 142 such that the switch 210 and the switches 142 simultaneously close when the gear shift 30 moves into high gear.

Summarizing the operation of the switch unit 28, the knob 198 is normally locked and is unlocked by the key 201. Once the knob 198 is free to turn, a turning of the knob from a relative clockwise position in a counterclockwise direction turns the shaft 178 and closes the ignition contacts 202 to allow the motorcycle to be started. In the relative counterclockwise position, the switch arm 186 closes the contacts 190, 190' to connect the circuit 22 and the motor power reducer equipment 16 to the signal generators 12 and 14. The motorcycle is started and accelerated from low to first and from first to second gear. During acceleration, the circuit 22 and motor power reducer equipment 16 function to prevent the rear wheel of the motorcycle from spinning relative to the front wheel in the manner previously described.

As the driver of the motorcycle shifts into high gear, the switches 210 and 142 automatically close. As this occurs, the rod 204 is withdrawn from the pivot arm 200, allowing the shaft 178 to turn in a clockwise direction under the influence of the spring. In the relative clockwise position, the switch arms 186 and 188 close the contacts 192, 192' and 194, 194' to connect the circuits 24 and 26 to the signal generators, thereby allowing the brake regulators 18 and 20 to prevent the front and rear wheels of the motorcycle from locking during a subsequent braking operation of the motorcycle.

The signal generators 12 and 14 have been described in general terms heretofore. The signal generators are identical in structure and a preferred form of the signal generator 12 is represented in FIGURES 2, 3, 4 and 5.

As illustrated, the signal generator 12 comprises a ring of magnets 214 on the front wheel of the motorcycle and a magnetic pickup unit 216 for generating electrical signals indicative of the angular velocity of the ring of magnets.

The ring of magnets 214 may be formed in various manners on various portions of the front wheel. In the illustrated form, however, the magnets are horseshoe magnets having dovetail sides adapted to fit within a mating dovetail annular recess 217 in the hub 218 of the front wheel.

The magnets may be inserted into the recess 217 at an enlarged portion and slipped around the recess. Between each magnet is a nonmagnetic spacer 222. Adjacent magnets are poled in opposite directions as indicated most clearly in FIGURE 5. That is, for adjacent magnets, the north and south poles are reversed. Once all magnets and spacers have been inserted into the annular recess, the enlarged portion may be closed to fixedly locate the ring of magnets in the hub 218 for rotation therewith.

In addition, a strip 223 of nonmagnetic material may be inserted within the space between the upwardly extending poles of the magnets to extend around the ring to further secure the ring of magnets in place.

The magnetic pickup unit 216 is fixedly supported over the ring of magnets 214 and for this purpose may be clamped to one of the wheel strut members, as illustrated most clearly in FIGURE 2.

The internal structure of the magnetic pickup unit 216 is illustrated most clearly in FIGURES 3 and 4. As represented, the magnetic pickup unit 216 includes a horseshoe shaped, soft iron core member 224 supported within a housing 226 having an open bottom. In this regard, upper and lower mounting discs 228 and 229 having elongated central slots 230 and 231 receive the core member 224 and bear against the inner surfaces of the cylindrical housing 226 to firmly hold the core member within the housing with the legs of the core member immediately over and aligned with the upper faces of the poles of the magnets 214 (see FIGURE 4). The lower end of the housing is sealed from dust and water by a membrane 232 of nonmagnetic material held in place by a snap ring 234. Within the housing, a coil 236 is wound around the central portion of the core 224 with wires leading to the outside of the housing for connection to the associated full wave rectifier.

In operation, as the front wheel of the motorcycle turns, the ring of magnets 214 passes immediately below the magnetic pickup unit 216. As this occurs, magnetic flux from one of the magnets travels upwardly through one leg of the core member 224 and downwardly through the other leg to complete a closed path for the magnetic flux from the magnet. As the wheel continues to turn, the next magnet comes into alignment with the core member 224 and a reversal of flux occurs with the magnetic flux flowing in an opposite direction through the magnetic core member. A reversal of flux occurs for each magnet 214. The repeated reversals of flux induce an alternating current in the coil 236 having a magnitude which is a function of the rate of charge of magnetic flux, that is, a function of the angular velocity of the wheel. Accordingly, with the signal generator 12, an A-C signal is generated indicative of the angular velocity of the front wheel.

A similar arrangement is provided for the rear wheel of the motorcycle such that the first and second electrical signals are developed in the safety apparatus 10 indicative of the angular velocity of the front and rear wheels. As previously described, the first and second electrical signals are employed by the circuitry of the safety apparatus to control the power applied to the rear wheels of the motorcycle and the action of the front and rear wheel barkes of the motorcycle to prevent undesired spinning of the rear wheel during acceleration of the motorcycle and dangerous locking of the wheels of the motorcycle during braking.

Although a particular form of safety apparatus has been described in some detail herein, changes and modifications may be made in the illustrated form without departing from the spirit of the invention. It is therefore intended that the present invention be limited in scope only by the terms of the following claims.

I claim:

1. Apparatus for controlling the braking and acceleration of a motorcycle or other motor-driven vehicle to prevent the wheels thereof from spinning or locking, the motorcycle including front and rear wheels, a motor drive for turning said rear wheel, and front and rear wheel brakes, said apparatus comprising:

selectively operable motor power reducing means connected to said motor drive for reducing the drive to said rear wheel;

front and rear electrically controllable brake regulator means connected to said front and rear brakes, respectively, for selectively reducing the braking action of said front and rear brakes on said front and rear wheels;

front and rear electrical signal generator means for generating first and second electrical signals indicative of the rotational velocity of said front and rear wheels, respectively;

first circuit means for receiving said first and second electrical signals and for operating said motor power reducing means to reduce the drive to said rear wheel when said electrical signals are of different value and indicating that said rear wheel is turning at a higher velocity than said front wheel thereby maintaining uniform front and rear wheel velocity and thereby preventing dangerous rear wheel spinning during acceleration of said motorcycle;

second circuit means for receiving one of said electrical signals and for operating one of said brake regulator means when said one electrical signal assumes a predetermined value to indicate that the wheel associated with said brake regulator means is or is about to lock, thereby preventing said wheel from locking and said motorcycle from skidding;

and switch means for selectively coupling said first circuit means to said motor power reducing means and said second circuit means to said one of said brake regulator means.

2. The apparatus of claim 1 further comprising third circuit means for receiving the other of said electrical signals and for operating the other of said brake regulator means when said other electrical signal assumes a predetermined value to indicate that the wheel associated with said other brake regulator means is or is about to lock, thereby preventing said wheel from locking and said motorcycle from skidding and wherein said switch means selectively couples said second and third circuit means to said front and rear brake regulator means.

3. The apparatus of claim 1 wherein said first circuit means includes means for comparing and balancing the magnitude of said first and second electrical signals and means for operating said motor power reducing means upon an unbalance of said first and second electrical signals.

4. The apparatus of claim 1 wherein said front and rear brake regulator means includes front and rear electrically controlled bypass valve means for selectively bypassing brake fluid from said front and rear brakes to reduce the brake fluid pressure therein and wherein said second circuit means is adapted to operate one of said bypass valve means.

5. The apparatus of claim 4 wherein said second circuit means includes a signal controlled switch for operating when the value of the signal applied thereto assumes said predetermined value.

6. The apparatus of claim 4 wherein said front and rear bypass valve means include front and rear bypass valves, brake fluid pressure equalizing means upstream of said bypass valves and between master cylinders of said front and rear brakes and said bypass valves, and a reservoir for receiving fluid bypassed by said bypass valves and returning same to said master cylinders.

7. The apparatus of claim 6 wherein said pressure equalizing means comprises a chamber including a pair of bladders having a connecting side wall, said bladders being adapted to receive brake fluid from the master cylinders of said front and rear brakes, respectively, and to pass same to said front and rear bypass valves.

8. The apparatus of claim 1 wherein said switch means includes a switch connected to the gear shift of said motorcycle for automatically deenergizing said first circuit means and automatically energizing said second circuit means when said motorcycle is in high gear.

9. The apparatus of claim 1 wherein said front and rear signal generator means comprise first and second rings of magnets on said front and rear wheels, said magnets comprising said rings being spaced from each other and adjacent ones of said magnets being poled in opposite directions, and first and second magnetic pickups mounted over said first and second rings for developing A-C signals as said wheels turn.

References Cited
UNITED STATES PATENTS

| | | |
|---|---|---|
| 2,332,584 | 10/1943 | McCune. |
| 2,395,203 | 2/1946 | Stewart _____ 317—5 |
| 2,788,186 | 4/1957 | Wilson _____ 188—181 X |
| 3,060,602 | 10/1962 | Buttenhoff. |
| 3,130,805 | 4/1964 | Carter et al. |
| 3,260,555 | 7/1966 | Packer _____ 303—21 |

KENNETH H. BETTS, *Primary Examiner.*